(12) United States Patent
Lee

(10) Patent No.: US 12,323,181 B2
(45) Date of Patent: Jun. 3, 2025

(54) OPTICAL COMMUNICATION DEVICE

(71) Applicant: SOLiD, INC., Seongnam-si (KR)

(72) Inventor: Eun Sung Lee, Ansan-si (KR)

(73) Assignee: SOLiD, INC., Seongnam-si (KR)

( * ) Notice: Subject to any disclaimer, the term of this patent is extended or adjusted under 35 U.S.C. 154(b) by 0 days.

(21) Appl. No.: 17/478,141

(22) Filed: Sep. 17, 2021

(65) Prior Publication Data

US 2022/0085877 A1 Mar. 17, 2022

(30) Foreign Application Priority Data

Sep. 17, 2020 (KR) .................. 10-2020-0120060

(51) Int. Cl.
*H04B 10/00* (2013.01)
*H04B 10/071* (2013.01)
*H04Q 11/00* (2006.01)

(52) U.S. Cl.
CPC ....... *H04B 10/071* (2013.01); *H04Q 11/0005* (2013.01); *H04Q 2011/0009* (2013.01); *H04Q 2011/0015* (2013.01)

(58) Field of Classification Search
CPC .............. H04J 14/0287; H04J 14/0297; H04J 14/0294; H04J 14/0295; H04J 14/029; H04B 10/032; H04Q 11/0005
See application file for complete search history.

(56) References Cited

U.S. PATENT DOCUMENTS

| | | | |
|---|---|---|---|
| 8,606,107 B2 * | 12/2013 | Bai ...................... | H04B 10/572 398/91 |
| 2002/0067525 A1 * | 6/2002 | Sakamoto .......... | H04B 10/2563 398/79 |
| 2002/0097954 A1 | 7/2002 | Maeno | |
| 2002/0145787 A1 | 10/2002 | Shpantzer et al. | |
| 2002/0178417 A1 | 11/2002 | Jacob et al. | |
| 2004/0208561 A1 | 10/2004 | Kinoshita et al. | |
| 2005/0141892 A1 * | 6/2005 | Park ..................... | H04B 10/032 398/71 |

(Continued)

FOREIGN PATENT DOCUMENTS

| KR | 10-1053057 B1 | 9/2011 |
|---|---|---|
| KR | 10-2020-0021395 A | 2/2020 |

OTHER PUBLICATIONS

Extended European Search Report issued Feb. 9, 2022 in European Application No. 21197447.2.
(Continued)

*Primary Examiner* — Pranesh K Barua
(74) *Attorney, Agent, or Firm* — Sughrue Mion, PLLC

(57) ABSTRACT

Provided is an optical communication device including: a multiplexer configured to multiplex one or more input optical signals to output a single first optical signal; a signal generator configured to generate a second optical signal having a preset wavelength; a filter configured to generate a third optical signal by combining the first optical signal and the second optical signal; a switch configured to connect any one of a plurality of optical cables connected to the switch with the filter to transmit the third optical signal through any one of the plurality of optical cables; and a controller configured to control the switch by analyzing reflected light of the second optical signal.

7 Claims, 2 Drawing Sheets

(56) References Cited

U.S. PATENT DOCUMENTS

| | | | |
|---|---|---|---|
| 2008/0062408 A1* | 3/2008 | Lai | H04J 14/0282 |
| | | | 356/73.1 |
| 2015/0229389 A1* | 8/2015 | Kim | H04B 10/073 |
| | | | 398/17 |
| 2018/0212704 A1 | 7/2018 | Morkel et al. | |
| 2018/0316418 A1* | 11/2018 | Magri | H04J 14/029 |

OTHER PUBLICATIONS

Office Action issued Sep. 24, 2024 in Korean Application No. 10-2020-0120060.

Communication dated Jan. 16, 2025 in European Application No. 21 197 447.2.

* cited by examiner

OPTICAL COMMUNICATION DEVICE

CROSS-REFERENCE TO RELATED APPLICATION

This application claims the benefit of Korean Patent Application No. 10-2020-0120060, filed on Sep. 17, 2020, in the Korean Intellectual Property Office, the disclosures of which are incorporated herein in its entirety by reference.

BACKGROUND

1. Field

The present disclosure relates to an optical communication device, and more particularly, to an optical communication device capable of individually switching optical paths for a plurality of optical communication modules configured therein.

2. Description of the Related Art

Research and development on a wavelength division multiplexing (WDM)-based subscriber network is being actively conducted. In a WDM-based passive optical Network (hereinafter referred to as 'WDM-PON'), communication between a central base station and a subscriber takes a method in which communication is performed using a wavelength determined for each subscriber. In the WDM-PON, because a dedicated wavelength is used for each subscriber, security is excellent, a large-capacity communication service is possible, and a different transmission technology (e.g., Link Rate, Frame Format, etc.) may be applied to each subscriber or service.

In such a WDM-PON, when communication is performed through a single optical path, the entire system may become out of service when the corresponding optical path is disconnected or attenuation increases due to aging. In order to solve this problem, in the WDM-PON, a redundant optical path is formed, and when a failure is found in a main optical path, communication is performed through a sub optical path.

The WDM-PON including the redundant optical path monitors a serviced wavelength (in-band wavelength) communication signal to determine whether the main optical path is faulty. Therefore, when the serviced wavelength (in-band wavelength) communication signal does not exist, there is a problem that the failure of the main optical path cannot be determined.

SUMMARY

Provided are optical communication devices capable of determining whether an optical path is faulty without a serviced wavelength (in-band wavelength) communication signal.

According to an aspect of the disclosure, an optical communication device comprises a multiplexer configured to multiplex one or more input optical signals to output a single first optical signal; a signal generator configured to generate a second optical signal having a preset wavelength; a filter configured to generate a third optical signal by combining the first optical signal and the second optical signal; a switch configured to connect any one of a plurality of optical cables with the filter to transmit the third optical signal through any one of the plurality of optical cables; and a controller configured to control the switch by analyzing reflected light of the second optical signal.

According to an exemplary embodiment, the first optical signal is an in-band optical signal, and the second optical signal is an out-band optical signal.

According to an exemplary embodiment, the controller is configured to switch the switch when optical power of the reflected light is less than a preset threshold value.

According to an exemplary embodiment, the controller is configured to determine that there is a connection error with another device when the reflected light is not received.

According to an aspect of the disclosure, an optical communication device comprises a coupler configured to output a first optical signal received from any one of a plurality of optical cables; a filter configured to, when the first optical signal is input, separate the first optical signal into a second optical signal and a third optical signal and output them through different routes; a reflector configured to reflect the second optical signal to output reflected light; and a multiplexer configured to demultiplex and output the third optical signal, the reflected light is transmitted to the plurality of optical cables through the coupler via the filter.

According to an exemplary embodiment, the filter is formed to output the second optical to the reflector only when the second optical signal corresponds to a preset wavelength.

According to an exemplary embodiment, the second optical signal is an out-band optical signal, and the third optical signal is an in-band optical signal.

According to an aspect of the disclosure, an optical communication system comprises a first optical communication device configured to multiplex one or more input optical signals to generate a single first optical signal, generate a second optical signal of a preset wavelength, generate a third optical signal by combining the first optical signal and the second optical signal, and transmit the third optical signal through any one of a plurality of optical cables through a switch; and a second optical communication device configured to receive the third optical signal through a coupler connected to the plurality of optical cables, separate the third optical signal into the first optical signal and the second optical signal, and reflect the second optical signal and transmit reflected light to the first optical communication device through the coupler, the first optical communication device controls the switch by analyzing the reflected light.

According to an exemplary embodiment, the first optical signal is an in-band optical signal, and the second optical signal is an out-band optical signal.

According to an exemplary embodiment, the first optical communication device switches the switch when optical power of the reflected light is less than a preset threshold value.

According to an exemplary embodiment, the second optical communication device is configured to transmit the reflected light only when the second optical signal corresponds to a preset wavelength.

According to an exemplary embodiment, the first optical communication device determines that there is a connection error with the second optical communication device when the reflected light is not received.

BRIEF DESCRIPTION OF THE DRAWINGS

Embodiments of the disclosure will be more clearly understood from the following detailed description taken in conjunction with the accompanying drawings in which.

DETAILED DESCRIPTION

Figure 1:
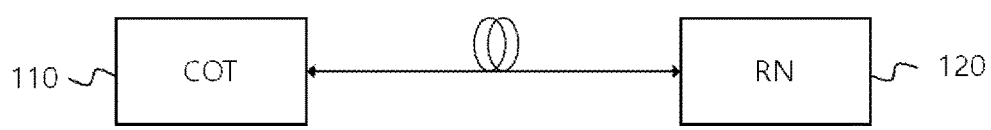
FIG. 1 is a block diagram of an optical communication network according to an embodiment.

Since the disclosure may have diverse modified embodiments, preferred embodiments are illustrated in the drawings and are described in the detailed description. However, this is not intended to limit the disclosure to particular modes of practice, and it is to be appreciated that all changes, equivalents, and substitutes that do not depart from the spirit and technical scope of the disclosure are encompassed in the disclosure.

In the description of the disclosure, certain detailed explanations of the related art are omitted when it is deemed that they may unnecessarily obscure the essence of the disclosure. In addition, numeral figures (e.g., first, second, and the like) used during describing the specification are just identification symbols for distinguishing one element from another element.

Further, in the specification, if it is described that one component "is connected to" or "accesses" the other component, it is understood that the one component may be directly connected to or may directly access the other component but unless explicitly described to the contrary, another component may be "connected" or "access" between the components.

In addition, terms including "unit," "er," "or," "module," and the like disclosed in the to specification mean a unit that processes at least one function or operation and this may be implemented by hardware or software such as a processor, a micro processor, a micro controller, a central processing unit (CPU), a graphics processing unit (GPU), an accelerated Processing unit (APU), a digital signal processor (DSP), an application specific integrated circuit (ASIC), and a field programmable gate array (FPGA) or a combination of hardware and software.

In addition, it is intended to clarify that the division of the components in the specification is only made for each main function that each component is responsible for. That is, two or more components to be described later below may be combined into one component, or one components may be divided into two or more components according to more subdivided functions. In addition, it goes without saying that each of the components to be described later below may additionally perform some or all of the functions of other components in addition to its own main function, and some of the main functions that each of the components is responsible for may be dedicated and performed by other components.

An optical communication system according to embodiments may be applied to various optical communication networks based on a wavelength division multiplexing-passive optical network (WDM-PON), which are located in remote locations and are composed of optical communication devices that transmit and receive optical signals through corresponding optical communication modules (optical transceiver).

For example, the optical communication system may configure an optical transport network that is a sub-network constituting a fronthaul segment of a radio access network architecture. However, the disclosure is not limited thereto, and the technical spirit of the disclosure may be applied to a midhaul segment and a backhaul segment of the radio access network architecture. As another example, the optical communication system may be applied to an optical subscriber network. As another example, the optical communication system may be applied to a distributed antenna system (DAS) for resolving a shadow area of a base station.

Hereinafter, for convenience of description, in a case where the optical communication system configures a fronthaul segment of the radio access network architecture described above, an embodiment of a system including an optical communication device (e.g., COT) connected to a digital unit or baseband unit at a central office side and an optical communication device (e.g., RN) connected to a remote unit or remote radio head at a remote location will be mainly described.

FIG. 1 is a block diagram of an optical communication network according to an embodiment.

Referring to FIG. 1, an optical communication system 100 according to an embodiment to may include a central office terminal (COT) 110 and a remote node (RN) 120. The COT 110 and the RN 120 may be connected to each other through a wire (especially optical cables).

The COT 110 is a central office of the optical communication system 100 and may be a device that multiplexes one or more optical signals and transmits them to the connected RN 120. For example, assuming that the optical communication system 100 is a passive optical communication network using wavelength division multiplexing (WDM), the COT 110 may receive a signal from an optical line terminal (OLT, not shown) and convert the signal into a WDM signal. That is, the COT 110 may transmit optical signals of multiple wavelengths to the RN 120 through a single optical cable. In this case, the COT 110 and the RN 120 may be connected to each other through two optical cables, and may transmit/receive WDM signals through only one of the two optical cables through a switch (the detailed description will be given later below).

The RN 120 is an optical communication device connected to the COT 110 through an optical cable, and may be an optical communication device located in a subscriber cluster area requiring a plurality of lines. The RN 120 may demultiplex the WDM signals received from the COT 110 and distribute them to subscribers. For example, the RN 120 may convert a WDM signal that is distributed and demultiplexed in a provided multiplexer into a PON signal and provide the PON signal to subscribers. That is, the COT 110 may multiplex optical signals of a plurality of wavelengths and transmit them to the RN 120 through a single optical cable, and the RN 120 may demultiplex the received WDM signal and transmit the WDM signal to subscribers. In this case, the RN 120 may receive the WDM signal from any one of the two optical cables connected to the COT 110. Hereinafter, an operation of selecting and/or managing any one of the two optical cables by the COT 110 and/or the RN 120 in the optical communication system 100 according to an embodiment will be described in detail with reference to FIGS. 2 and 3.

Figure 2:
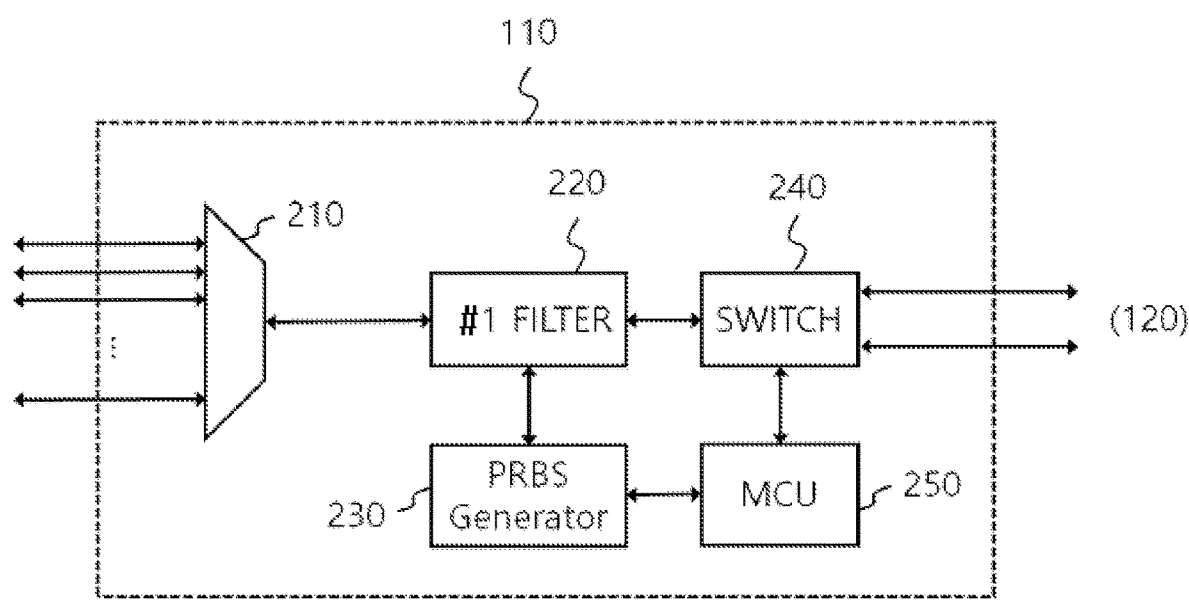
FIG. 2 is a block diagram of a first optical communication device (COT) according to an embodiment.
Figure 3:
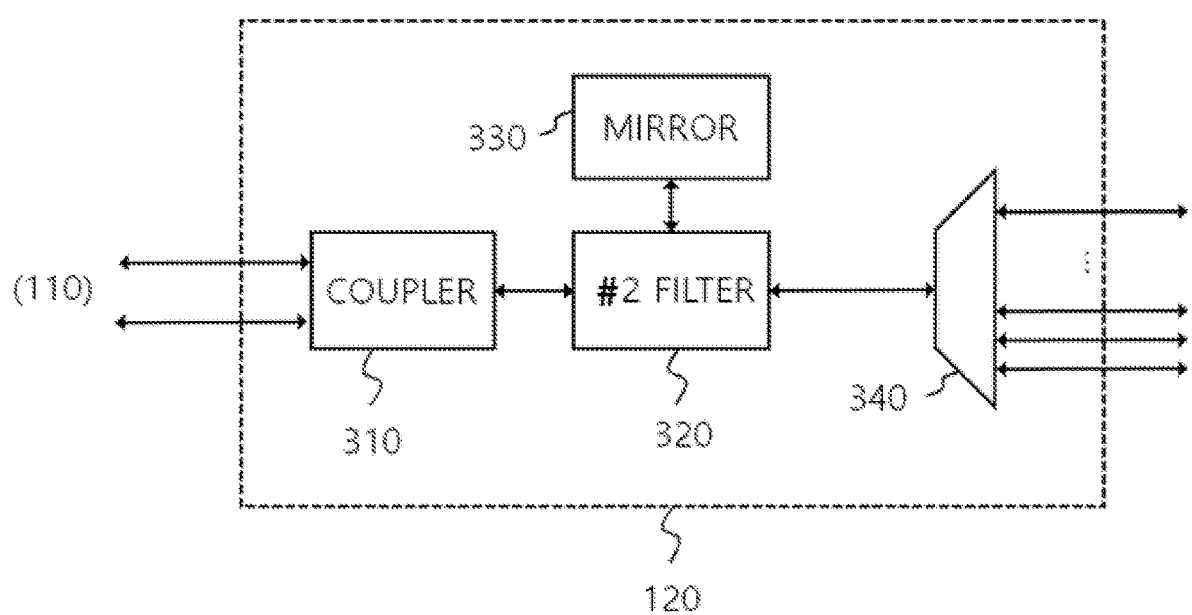
FIG. 3 is a block diagram of a second optical communication device (RN) according to an embodiment.

FIG. 2 is a block diagram of a first optical communication device (COT) according to an embodiment, and FIG. 3 is a block diagram of a second optical communication device (RN) according to an embodiment.

Referring to FIG. 2, the first optical communication device 110 according to an embodiment may be a COT, and may include a first multiplexer (MUX) 210, a first filter (FILTER) 220, a signal generator 230, a switch (SWITCH) 240, and a controller (main control unit, MCU) 250. In this case, the signal generator 230 may be a pseudo random binary sequence (PRBS) generator. In addition, although not shown, it is obvious that the first optical communication device 110 may further include one or more optical modules (SFP, etc.) for transmitting a PON signal to the first MUX 210.

Referring to FIG. 3, the second optical communication device 120 according to an embodiment may be an RN, and may include a second MUX 340, a second filter (FILTER) 320, a reflector 330, and a coupler 310. In this case, the reflector 330 may be included irrespective of its type as long as the reflector 330 reflects an optical signal input from the second filter 320, such as a mirror MIRROR, and outputs the optical signal back to the second filter 320. In addition, although not shown, it is obvious that the second optical communication device 120 may further include one or more optical modules (SFP, etc.) for processing a PON signal demultiplexed by the second MUX 340.

The first optical communication device 110 may be connected to the second optical communication device 120 through two optical cables. The first optical communication device 110 may monitor the two optical cables to transmit and receive WDM signals through an optical cable in a normal state.

First, the first MUX 210 may output a single WDM optical signal (hereinafter referred to as 'first optical signal') to the first filter 220 by multiplexing one or more PON signals. In this case, the first optical signal may be an in-band optical signal corresponding to an actually serviced wavelength or frequency. An in-band signal may mean a signal within a frequency used for transmission of Payload data.

The first filter 220 may generate a third optical signal by combining the input first optical signal and a second optical signal, and may output the third optical signal through an optical cable connected thereto through the switch 240. The second optical signal may be a signal generated by the signal generator 230. For example, the second optical signal may be an optical signal generated by the signal generator 230 that is a PRBS generator. Accordingly, the signal generator 230 may include an optical module (e.g., SFP, etc.) capable of generating and outputting an optical signal corresponding to a preset frequency. In this case, the second optical signal may be an out-band optical signal that does not correspond to an actually serviced wavelength or frequency. An out-band signal may mean a signal within a frequency other than a frequency used for information transmission.

The switch 240 may be configured to connect the first filter 220 to any one of the two connected optical cables under the control of the controller 250. For example, when the switch 240 connects a first optical cable to the first filter 220, the third optical signal output from the first filter 220 may be transmitted to the second optical communication device 120 through the first optical cable. As another example, when the switch 240 connects a second optical cable to the first filter 220, the third optical signal output from the first filter 220 may be transmitted to to the second optical communication device 120 through the second optical cable.

The coupler 310 of the second optical communication device 120 may output the third optical signal received from any one of the first optical cable and the second optical cable to the second filter 320.

The second filter 320 may include a filter capable of outputting a signal of a preset wavelength by separating the signal from a signal of the remaining wavelength, and may separate the input third optical signal into the first optical signal and the second optical signal through the filter, and output them through different routes. For example, the second filter 320 may output the first optical signal to the second MUX 340 and output the second optical signal to the reflector 330.

The second MUX 340 may demultiplex the input first optical signal and output the first optical signal to an optical module connected thereto. For example, the second MUX 340 may demultiplex the second optical signal, which is a WDM optical signal, to separate the second optical signal into one or more PON optical signals, and may output the separated PON optical signal to a corresponding optical module to be converted into an electrical signal. However, the second MUX 340 may generate a fourth optical signal, which is a single WDM optical signal, by multiplexing an input PON optical signal, and may output the generated fourth optical signal to the second filter 320.

Meanwhile, the second optical signal output to the reflector 330 may be reflected and output to the second filter 320 again. The second optical signal reflected by the reflector 330 is referred to as 'reflected light' to distinguish it from the second optical signal received by the first optical communication device 110. The reflector 330 may be included irrespective of its shape and type as long as the reflector 330 may generate reflected light by reflecting the second optical signal like the mirror MIRROR.

The second filter 320 may output the reflected light input from the reflector 330 to the coupler 310. Alternatively, the second filter 320 may generate a fifth optical signal by combining the reflected light and the fourth optical signal when the fourth optical signal is input from the second MUX 340 together with the reflected light, and may output the fifth optical signal to the coupler 310.

The coupler 310 may transmit the fifth optical signal through both of the two connected optical cables. The coupler 310 may transmit half of the fifth optical signal through the first optical cable and the other half through the second optical cable. Alternatively, the coupler 310 may transmit the fifth optical signal only through the optical cable to which the third optical signal is input. This is because the coupler 310 may store a cable to which the third optical to signal is input (in this case, the coupler 310 may further include a configuration such as a photodiode capable of determining whether an optical signal is received)

In addition, the first filter 220 of the first optical communication device 110 may receive the fifth optical signal from any one of the first optical cable and the second optical cable through the switch 240. That is, the first filter 220 may receive the fifth optical signal from either the first optical cable or the second optical cable activated through the switch 240 (connected to the second optical communication device 120).

The first filter 220 may divide the fifth optical signal into the fourth optical signal and reflected light. In addition, the first filter 220 may output the fourth optical signal to the first MUX 210. The first MUX 210 may demultiplex the fourth optical signal and output the fourth optical signal to an optical module connected thereto.

The first filter 220 may output the reflected light to the signal generator 230. That is, the first filter 220 may include a bandpass filter capable of filtering only a signal of a preset wavelength from among out-band wavelengths, and may output only reflected light of a preset wavelength filtered through the bandpass filter to the signal generator 230. The signal generator 230 may output the reflected light to the controller 250 connected thereto.

The controller 250 may analyze the reflected light and output a control signal corresponding to a result of the analyzing to the switch 240. Prior to describing an operation of generating the control signal of the controller 250, the following operation may have been performed.

First, the signal generator 230 may output a 'notification signal' to the controller 250 while generating and outputting the second optical signal. Second, the controller 250 may recognize that a second reflected light is output from the signal generator 230 according to reception of the notification signal. That is, the notification signal may be a signal for notifying the controller 250 that the second optical signal is output. Hereinafter, an operation of generating a control signal of the controller 250 will be described.

The controller 250 may measure optical power of input reflected light. The controller 250 may compare measured optical power of the reflected light with a preset threshold value. Because of the comparison, when the optical power of the reflected light is less than a threshold value, the controller 250 may output a control signal to the switch 240. The switch 240 receiving the control signal may change an optical cable connected to the first filter 220. That is, when the first filter 220 is connected to the first optical cable, the switch 240 may perform a switching operation so that the first filter 220 may be connected to the second optical cable when a control signal is received.

In addition, when reflected light is not input, the controller 250 may determine that there is an error in the connection with the second optical communication device 120. The 'error in the connection' does not mean disconnection of the first optical cable and/or the second optical cable, but may mean a state of being connected to another optical communication device other than the second optical communication device 120. The second filter 320 of the second optical communication device 120 may be set to correspond to a wavelength of the second optical signal generated by the signal generator 230. That is, the second filter 320 of the second optical communication device 120 may be formed to filter only a signal (i.e., an optical signal corresponding to an out-band) of a wavelength generated by the signal generator 230 and output the signal to the reflector 330. Accordingly, when reflected light is not input, the controller 250 may recognize that another optical communication device other than the second optical communication device 120 is connected thereto. In this case, the controller 250 may determine whether a connection error as described above is made by determining whether a notification signal is input and reflected light is input within a preset time. In addition, when it is determined that a connection error is made, the controller 250 may notify an administrator or the like of this through a short message service (SMS), e-mail transmission, alarm output, or the like.

As described above, the optical communication system 100 according to the disclosure may automatically determine whether there is an optical path failure without a first optical signal of an in-band wavelength being serviced, and further may automatically determine that it is a "connection error" between devices that do not correspond to each other.

An optical communication device according to embodiments may determine whether an optical path is faulty without a serviced wavelength (in-band wavelength) communication signal.

While the embodiments have been particularly shown and described, it will be understood by one of ordinary skill in the art that various changes in form and details may be made therein without departing from the spirit and scope of the disclosure as defined by the appended claims.

The invention claimed is:

1. An optical communication system comprising:
a first optical communication device configured to multiplex one or more input optical signals to generate a single first optical signal, generate a second optical signal of a preset wavelength, output a notification signal while the second optic signal is generated and output, generate a third optical signal by combining the first optical signal and the second optical signal, and transmit the third optical signal to a second optical communication device through any one of a plurality of optical cables through a switch; and
the second optical communication device configured to receive the third optical signal through a coupler connected to the plurality of optical cables from the first optical communication device, separate the third optical signal into the first optical signal and the second optical signal, and reflect the second optical signal and transmit reflected light to the first optical communication device through the coupler,
wherein the first optical communication device controls the switch by analyzing the reflected light,
wherein the reflected light is transmitted to at least one of the plurality of optical cables through the coupler, and
wherein the at least one of the plurality of optical cables includes an optical cable from which the first optical signal is received,
wherein, in a case that the reflected light is not received to the first optical communication device during a preset time after the notification signal is output, the first optical communication device is configured to determine that there is a connection with a third optical communication device other than the second optical communication device through the optical cable that the third optical signal is transmitted.

2. The optical communication system of claim 1, wherein the first optical signal is an in-band optical signal, and the second optical signal is an out-band optical signal.

3. The optical communication system of claim 1, wherein the first optical communication device switches the switch when optical power of the reflected light is less than a preset threshold value.

4. The optical communication system of claim 1, wherein the second optical communication device is configured to transmit the reflected light only when the second optical signal corresponds to a preset wavelength.

5. A first optical communication device comprising:
a multiplexer configured to multiplex one or more input optical signals to output a single first optical signal;
a signal generator configured to generate a second optical signal having a preset wavelength;
a filter configured to generate a third optical signal by combining the first optical signal and the second optical signal;
a switch configured to connect any one of a plurality of optical cables with the filter to transmit the third optical signal through any one of the plurality of optical cables to a second optical communication device; and
a controller configured to control the switch by analyzing reflected light of the second optical signal,
wherein the reflected light is received from the second optical communication device through at least one of the plurality of optical cables,
wherein the at least one of the plurality of optical cables includes an optical cable to which the third optical signal is transmitted, wherein the signal generator is configured to output a notification signal to the controller while the second optical signal is generated and output;

wherein, in a case that the reflected light is not received to the first optical communication device during a preset time after the notification signal is output, the controller is configured to determine that there is a connection with a third optical communication device other than the second optical communication device through the optical cable that the third optical signal is transmitted.

6. The first optical communication device of claim 5, wherein the first optical signal is an in-band optical signal, and the second optical signal is an out-band optical signal.

7. The first optical communication device of claim 5, wherein the controller is configured to switch the switch when optical power of the reflected light is less than a preset threshold value.

\* \* \* \* \*